United States Patent

[11] 3,592,991

[72] Inventors John L. Turner
East St. Louis;
Albert J. Hoppenjans, Jr., Belleville, both of, Ill.
[21] Appl. No. 834,454
[22] Filed June 18, 1969
[45] Patented July 13, 1971
[73] Assignee Turner Electric Corporation
East St. Louis, Ill.

[54] TORQUE CONVERTER
30 Claims, 5 Drawing Figs.
[52] U.S. Cl. .................................................. 200/153 V, 185/37
[51] Int. Cl. .................................................. H01h 3/38
[50] Field of Search ......................................... 200/153, 153.22, 153.8, 153.20; 335/76; 185/37, 39

[56] References Cited
UNITED STATES PATENTS
2,822,445 2/1958 Schindlev et al. ............. 200/109
2,769,874 11/1956 Coggeshall et al. ............ 200/89
2,846,622 8/1958 Miller et al. ................... 317/58
2,023,235 12/1935 Count ............................ 185/37
3,227,244 1/1966 Pelenc .......................... 185/39

FOREIGN PATENTS
1,153,440 8/1963 Germany ....................... 200/153.8

Primary Examiner—Milton O. Hirshfield
Assistant Examiner—B. A. Reynolds
Attorney—Bedell & Burgess ABSTRACT: A torque converter device for producing a uniform high velocity closure of electrical air break switches and the like, comprising coaxial input and output shafts, torsionally resilient means connecting both shafts for transmitting torsional movements from the input shaft to the output shaft, latch means operable during movements of the input and output shafts in one direction (toward closure of the switch) for interrupting movements of the output shaft at a predetermined point between extreme positions thereof while permitting continued movement of the input shaft in the same (switch closing) direction, nd additional means, responsive to further movements of the input shaft for releasing the interrupting means and permitting torque accumulated in the torsion spring to rotate the output shaft throughout the remainder of its travel at uniform high angular velocities. The interrupting means is automatically cocked responsive to movement of the input and output shafts in unison in the opposite (switch opening) direction.

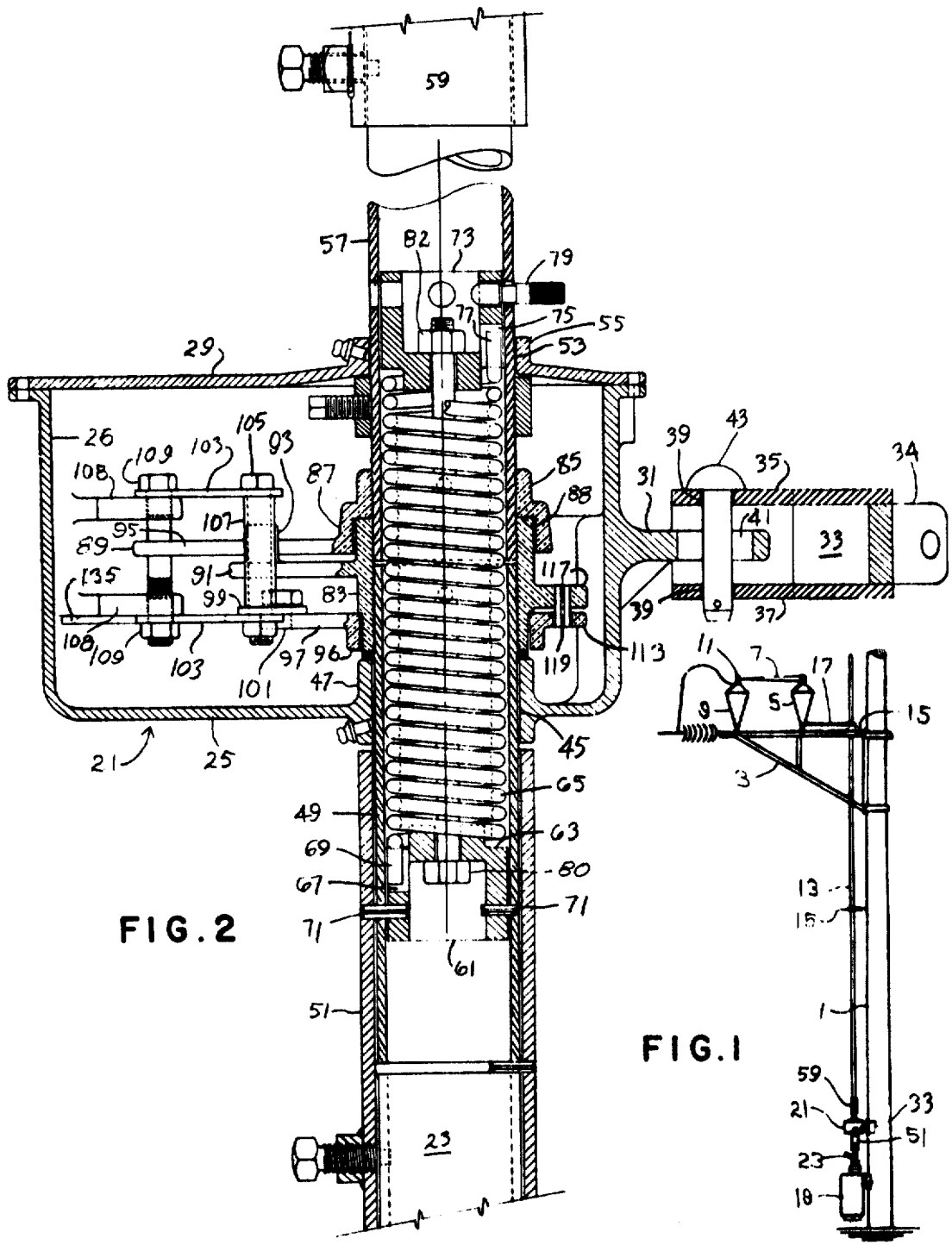

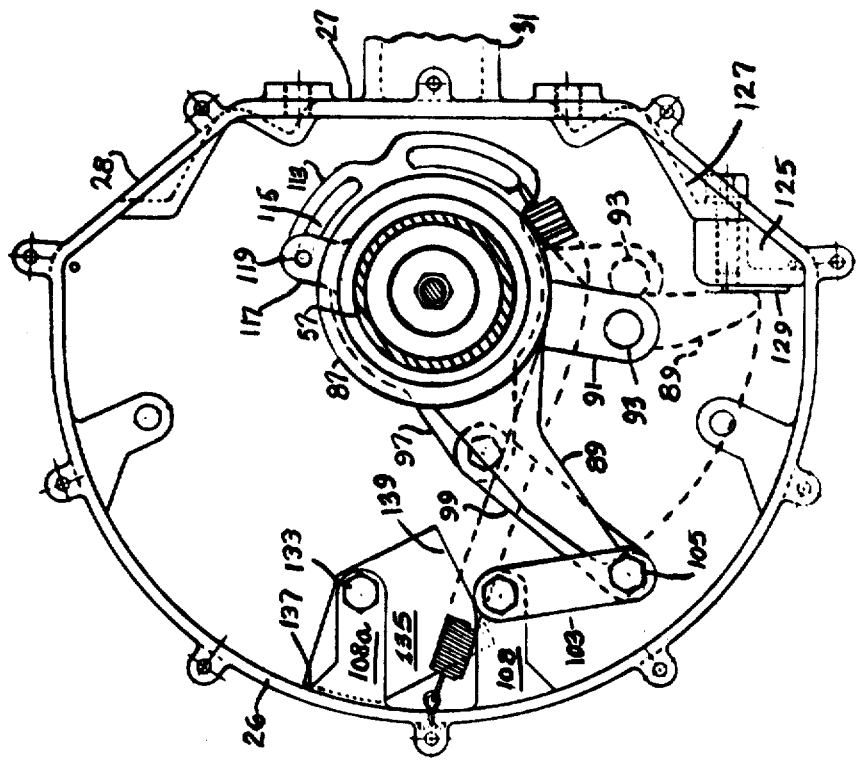
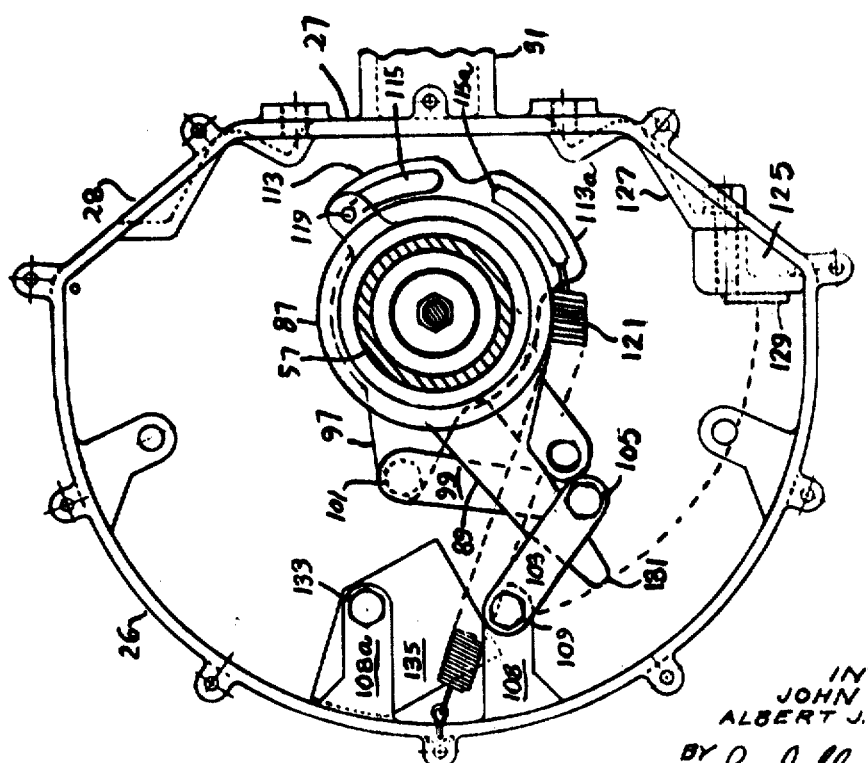

TORQUE CONVERTER

BACKGROUND OF THE INVENTION:

1. Field of the Invention

The invention relates to devices for converting and transmitting torque from one element to another and consists particularly in means for providing a uniformly high output velocity at the end of a rotational movement such as in the closure of an electrical switch irrespective of the input velocity.

2. Description of the Prior Art

Large electrical switches, such as those of high voltage sectionalizing switchgear, have in the past been arranged for manual operation, with the operators instructed to complete their closure at high speed to avoid arcing between the blade to the jaws as the blade approaches the jaw. Nevertheless, different manual operators close switches differently, some at such high speed throughout the closing movement that the high impact on closure seriously damages the equipment, while others close the switches so slowly that serious arcing occurs. Moreover, such switches are frequently in such locations that remote control, utilizing an electric motor operator, is necessary or desirable. Such motors preferably operate at a substantially constant low speed, because if they operated at high speed throughout the switch closing arc, the high terminal impact would likely damage the switch equipment. The present invention provides a torque converter for positioning between the operator, whether manual or power, and a switch or switches, for producing a uniformly fast terminal velocity during the closure of the switches, irrespective of the initial velocity imparted by the manual or motor operator.

SUMMARY OF THE INVENTION

The invention utilizes the energy-storing capability of a torsion spring, connecting an input and an output shaft, to provide a uniform driving force on the output shaft throughout the final arc of movement of the output shaft, irrespective of the speed at which the input shaft is rotated, so as to provide a uniform high terminal velocity to a switch blade upon closure, without sufficiently high impact to damage the switch.

BRIEF DESCRIPTION OF THE DRAWINGS:

FIG. 1 shows a line pole mounting switches in phase over phase relation and switch operating means incorporating the present invention.

FIG. 2 is an enlarged vertical sectional view, taken along line 2-2 of FIG. 3, of the torque transmitting device embodying the invention.

FIGS. 4 and 5 correspond to FIG. 3 but show the torque transmitting device mechanism in different sequential position.

DESCRIPTION OF THE PREFERRED EMBODIMENT

Figure 3:
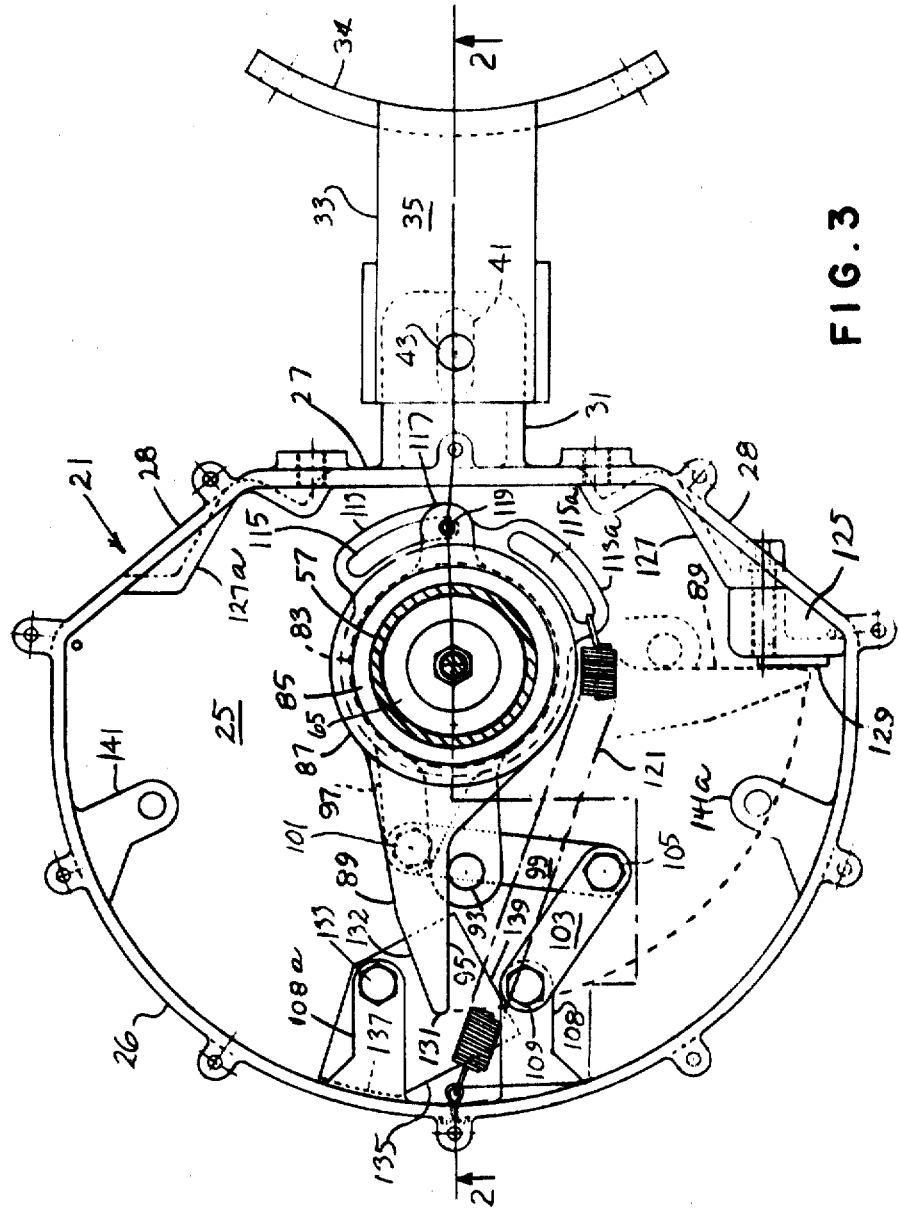
FIG. 3 is a plan view of the torque transmitting device with the top cover removed and with the parts in the switch-open position.

The numeral 1 indicates a pole, mounting, on a suitable bracket 3, three air break switches (only one of which is shown) each comprising a rotatable insulator 5, a switch blade 7 secured to insulator 5 for rotation therewith, and a fixed insulator 9 supporting switch jaws 11. Switch blade 7 is selectively swingable into and out of engagement with jaws 11 by rotation of insulator 5 about its axis. Only the lowermost of three brackets and switches (one for each phase) is shown, the others being identical and mounted on pole 1 in phase over phase relation. To permit operation of the switches from the ground, a vertical operating shaft 13 is journaled in suitable brackets 15 on pole 1, and is connected by suitable linkage 17 to rotatable insulators 5 of the three switches so that, upon clockwise rotation of shaft 13, switch blades 7 will be swung from the closed position shown in FIG. 1 to an open position normal to the surface of the drawing and upon counterclockwise rotation of shaft 13, blades 7 will be returned to the closed position shown in FIG. 1.

Shaft 13 may be manually operated or it may be operated by a motor 19 supported on pole 1 near the base thereof and operatively connected to shaft 13.

In order to prevent arcing upon closure of the switch, it is desirable that the last portion of closing movements be at a uniform high angular velocity, but to avoid mechanical damage to the switchgear, it is desirable that the initial closing movements be at a lower velocity. To achieve this goal, a torque converter device, generally indicated at 21, is interposed between shaft 23 of motor 19 and shaft 13.

Torque converter 21 shown in the switch-open position in FIGS. 2 and 3 comprises a boxlike housing having a horizontal bottom wall 25 and an upright peripheral wall having a semicircular portion 26 facing away from pole 1 and a convex polygonal portion consisting of a flat center section 27 and two flat side sections 28. A removable top wall or cover 29 is provided. Flat center section 27 is formed with a horizontal bracket 31 for attachment to a mating bracket 33 secured to pole 1. Pole bracket 33 comprises an arcuate plate 34, a pair of horizontal vertically spaced radially projecting plates 35 and 37 which are formed with vertically aligned holes 39, and housing bracket 31 is formed with a radially elongated slot 41 whose radial sides are vertically aligned with the sides of holes 39. A pin 43 passes through both vertically aligned holes 39 and corresponding slot 41 and holds housing 21 against rotation, while accommodating its movement radially with respect to the pole and vertically between pole bracket plates 35, to facilitate connection of torque converter 21 to motor shaft 23 and switch operating shaft 13.

Bottom wall 25 of the housing is formed with a cylindrical opening 45 concentric with semicylindrical wall portion 26. Opening 45 is surrounded by a double flange 47 and a vertical input shaft 49 extends through opening 45, terminating within the housing some distance above flange 47. At its lower end input shaft 49 is rigidly connected by coupling sleeve 51 to motor shaft 23 so that motor torque is transmitted directly to input shaft 49.

Top wall 29 of the housing is also formed with a vertical cylindrical opening 53 concentric with semicylindrical wall portion 26 and vertically aligned with bottom opening 45. Top opening 53 is surrounded by an upstanding flange 55, and a vertical output shaft 57 coaxial with input shaft 49 extends through the cylindrical opening 53 and is rotatably journaled therein. The lower end of output shaft 57 is in close proximity but slightly vertically spaced from the upper end of input shaft 49. At its upper end output shaft 57 is connected by a coupling sleeve 59 to switch operating shaft 13.

For yieldingly transmitting rotational movements from motor shaft 23 to switch operating shaft 59, input shaft 49 is provided with an internal upwardly facing cylindrical spring retainer 61 annularly rabbeted on its upper edge as at 63 to receive the base of a coil driving spring 65 and formed with an axial slot 67 in its periphery to receive the axially extending end 69 of spring 65. Spring retainer 61 is secured in input shaft 49 at a level substantially below the top of shaft 49 by suitable means 71.

Driving spring 65 extends upwardly a substantial distance within output shaft 57, and its top is seated against the bottom surface of a downwardly facing spring retainer 73 which is positioned within output shaft 57 some distance above its lower end. Retainer 73 is similar to retainer 61, having an axial slot 75 in its periphery in which the upper end 77 of spring 65 is received, and is secured against rotation with respect to output shaft 57 by suitable means 79. A long bolt 80 extends axially of the shafts through spring retainers 61 and 73, and a nut 82 thereon holds the two shafts in assembled relation.

From the foregoing it will be evident that rotation of motor shaft 23 and input shaft 49 will be transmitted to output shaft 57 and switch operating shaft 13 by driving spring 65, by virtue of its resistance to torsion, but that transmission of torsional forces from the motor shaft to the switch operating shaft can be interrupted during closing movements and output shaft 57 maintained stationary during some rotational movement of input shaft 49, after which output shaft 57 can be released to permit driving spring 65, torsionally tensed by continued rotation of input shaft 49, to cause high velocity terminal rotation of output shaft 57 and switch operating shaft 13, thereby closing the switches fast and substantially eliminating arcing.

For providing such an interruption and releases of the output shaft at predetermined angular positions during its switch-closing movements, input shaft 49 rigidly mounts at its upper end a collar 83. The lower rim of collar 83 is supported on flange 47 around opening 45 and the upper portion of collar 83 rotatably surrounds the lower end of output shaft 57, helping to maintain the input and output shafts in axial alignment. A second collar 85 is rigidly mounted on the lower portion of output shaft 57 and has an enlarged bottom portion 87 rotatably surrounding input collar 83. An annular shoulder 88 formed within the enlarged bottom portion rests on the top rim of input collar 83 to rotatably support output shaft 57 in vertically spaced relation on input shaft 49. Output collar 85 is formed with a long radial arm or release lever 89, and input collar 83 is formed with a short radial arm or cocking lever 91 having at its outer end an upstanding boss 93 engageable with the leading radial edge 95 of release lever 89 so as to retain the release lever, output collar 85 and output shaft 57 in the switch fully open position as shown in FIG. 3 when motor shaft 23 and input shaft 49 are in that position. Since release lever 89 is rigid with output shaft 57, movement of the release lever defines the limits of movement of the output shaft. Thus, as best seen in FIG. 3, the device is arranged for 90° closing movement of the switches 7 from the solid line nine o'clock position of release lever 89 to the broken line six o'clock position.

For temporarily restraining release lever 89 and output shaft 57 against rotational movement during closing movement of input shaft 49, a third collar 96 is rotatably journaled on the lower portion of input collar 83 and is formed with a short radial arm or latch lever 97 which, when the device is in the switch-open position, is substantially in radial alignment with release lever 89. A link 99 is pivotally connected by vertical bolt 101 to the extremity of latch lever 97, and a second pair of vertically spaced links 103 are pivotally connected to the end of link 99 remote from latching lever 97 by a long vertical bolt surrounded between upper and lower links 103 by a tubular spacer 107, link 99 and lower link 103 being below release lever 89 and upper link 103 being above release lever 89. Links 103 in turn are connected to brackets 108 extending inwardly from housing peripheral wall by bolts 109 and are inclined therefrom in the direction of closing movement of the input and output shafts, such that when the device is in the full-open position and for approximately 30° of movement thereafter sleeve 107 is positioned radially inwardly of the extremity of release lever 89 with respect to the output shaft axis, so as to interrupt further movement of output shaft 57 toward switch-closed position after initial movement transmitted to output shaft 57 from input shaft 49 by drive spring 65.

For permitting substantially instantaneous completion of the closing movement of output shaft 57 when the input shaft has reached its fully closed position, a lost-motion connection is provided between input collar 83 and latching collar 96. The lost-motion connection comprises a radial flange 113 on the latching collar, which is arcuately slotted as at 115, a radial bracket 117 on input collar 83 diametrically opposite cocking lever 91, and a pin 119 depending from bracket 117 into slot 115 for arcuate movement therein. A coil tension spring 121 is connected at one end to bracket 113a and at its other end to housing peripheral wall 26 to bias latching collar 96 clockwise to the position shown in FIGS. 2 and 3. Thus, as input shaft 49 and its collar move counterclockwise from switch-closed toward switch-open position, spring 121 opposes counterclockwise movement of latching collar 96 and prevents such movement until input shaft 49, its collar 83 and bracket 117 reach the angular position shown in FIG. 4. When this occurs, the leading edge of release lever 89 will engage sleeve 107 of linkage 99, 103, preventing further counterclockwise (switch closing) movement of output shaft 57.

Continued movement of input shaft 49, its collar 83, bracket 117 and pin 119 after the latter has reached the counterclockwise end of slot 115 causes latching collar 96 to move counterclockwise to the position shown in FIG. 5 when the input shaft has moved to approximately 10° short of the switch full-closed position. When this occurs latch arm 97 has moved counterclockwise to the position shown in FIG. 5, causing linkage 99, 103 to assume the configuration shown in FIG. 5, wherein link-connecting bolt 105 and its surrounding sleeve 107 (not visible in FIG. 5) are positioned radially outwardly of the extremity of release lever 89, which is then free to move counterclockwise along the broken line arc to the switch-closed position in which it is shown in broken lines (FIG. 5). This latter movement is practically instantaneous upon the release of release lever 89 by linkage sleeve 107, and is caused by torsion developed in driving spring 65 by continued rotation of input shaft 49 after linkage sleeve 107 had prevented further rotational movement of release lever 89. This final movement of output shaft 49 is transmitted through coupling sleeve 59, switch operating shaft 13 and linkages 17 to complete closure of the switches by rotating insulators 5 and thereby swinging blades 7 into jaws 11 at high speed, thereby avoiding arcing between the switch blades and jaws as the closed position is approached.

In order to prevent movement of output shaft 57 and consequently of the switch blades 7 past the closed position, with resultant damage to the switches, a stop element 125 is secured to an indented portion 127 of housing peripheral wall 27, stop element 125 being faced with a flat pad 129 of elastomeric material to cushion the impact of release lever 89 upon completion of the switch-closing movement.

The switches may be opened by reversing motor 19 to rotate input shaft 49 and with it input collar 83 in a clockwise direction, movement of the input shaft and collar being transmitted to output shaft 57 and output collar 85 by driving spring 65 and by the engagement of cocking lever boss 93 and release lever 89. As input collar 83 rotates clockwise, corresponding rotation of its bracket 117 and pin 119 in slot 115 of latching collar flange 113 permits spring 121 to rotate latching collar 96 and latching lever 97 clockwise, to move latching linkage sleeve 107 radially inwardly of the extremity of release lever 89, i.e., toward the latching position shown in FIGS. 3 and 4. To permit release lever 89 and output shaft 57 to return to their switch full-open position, in which release lever 89 is positioned in a clockwise direction from latching linkage sleeve 107, as shown in FIG. 3, the extremity 131 of release lever 89 is rounded and the outer end portion 132 of the clockwise leading edge of lever 89 is tapered so as to engage sleeve 107 and push it and the linkage to the position of the linkage shown in FIG. 5 until release lever 89 has cleared sleeve 107, after which spring 121 rotates latching collar 96 to the position shown in FIGS. 3 and 4, with the latching linkage sleeve 107 interposed in the path of switch-closing movement of release lever 89.

To prevent excessive opening movement of the output shaft, a second pair of inwardly extending vertically aligned brackets 108a, similar to brackets 108, is positioned symmetrically with respect thereto on the inner surface of semicylindrical wall 26 and a long vertical bolt 133 passes through them for engagement with release lever 89 if 90° of opening movement is exceeded as a result of nonfunctioning or improper setting of the motor stops.

To prevent excessive clockwise swinging of links 103 and movement of linkage 99, 103 to a nonfunctioning straight line configuration, a plate 135 is secured to the bottom of bottom bracket 108a by a nut on the protruding lower end of bolt 133, plate 135 being held against rotation about bolt 133 by engagement of an arcuate side 137 with the inner surface of semicylindrical wall 26 so that another side 139 of plate 135 abuts the counterclockwise facing edge of bottom link 103 when the maximum permissible counterclockwise movement of the link is attained, thereby preventing further counterclockwise movement of link 103.

Although 90° is a common angularity for opening and closing movements of switches, other angular values up to 180° are sometimes used, and the present torque impact converter is capable of adjustment for use at any angular increment between 90° and 180° and for clockwise as well as counterclockwise closure. For counterclockwise operation, the position of the parts can simply be reversed, e.g., stop 125 can be shifted to the opposite indentation 127a in the other flat wall 25 (uppermost in FIG. 3), link 103 pivoted to bracket 108a on wall portion 26, pin 119 inserted in slot 115a in flange 113 of latching collar 96 and spring 121 connected to the counterclockwise leading end of slot 115 instead of to slot 115a.

For 180° closing and opening movements, brackets 141 and 141a are provided on the inner surface of the semicylindrical housing wall portion at approximately the eleven o'clock and seven o'clock positions. For counterclockwise 180° closing movements, substantially longer latch links 103 would be pivoted to brackets 141 and for clockwise movements to brackets 141a. By suitably relocating brackets 141 or 141a at different angular positions on wall portion 26, the device can be readily arranged for closing movements of any desired angularity.

Operation of the device is as follows: With switch blades 7 (FIG. 1) open, i.e., perpendicular to the sheet and pointing away from the viewer, the parts of torque impact converter are as shown in FIG. 3, with release lever 89 in the nine o'clock position. As motor 19 is energized, it rotates input shaft 49, causing spring 65 to rotate output shaft 57 correspondingly until the counterclockwise leading edge of release lever 89 engages sleeve 107 on bolt 105 connecting links 103 and 99, as seen in FIG. 4. This interrupts rotation of output shaft 57 and corresponding swinging of switch blades 7, but motor 19 continues to rotate input shaft 49 and thus tenses spring 65 in torsion. Continued rotation of input shaft 49 and its collar 83 causes pin 119, which has moved counterclockwise in latching collar slot 115 to the counterclockwise forward end of the slot, to cause similar rotation of latching collar 96 and latch linkage arm 97 to rotate so that bolt 105, connecting links 99 and 103, moves radially outwardly, bolt sleeve 107 rolling along the counterclockwise leading edge of release lever 89 until, when the input shaft and its collar are about 10° short of full-closed position, linkage sleeve 105 will be in the position shown in FIG. 5, clear of the rounded end 131 of release lever 89. This action, which occurs about 30° from switch-open position, releases output shaft 57 and permits torsion spring 65, under counterclockwise tension from input shaft 49, to rotate the output shaft at high velocity, thereby through operating shaft 13, linkages 17 and insulators 5 similarly swinging switch blades 7 toward closed position in jaws 11. As release lever 89 thus moves toward the broken line switch-closed position against stop pad 129, motor 19 has continued to rotate input shaft 49 and with it cocking lever 91 to the broken line position shown in FIG. 5, so as to avoid interference with the high velocity closing movement of release lever 89, output shaft 57 and switch blades 7. Because of the high speed of closure, arcing between the blades and jaws is avoided.

When motor 19 is reversed to open the switches it causes input shaft 49 to rotate clockwise which, through the engagement of cocking lever boss 93 and release lever 89, produces similar clockwise rotation of output shaft 57. Simultaneously, clockwise movement of pin 119 permits spring 121 to rotate latching collar 96 and its arm 97 clockwise, returning linkage connecting bolt 105 and its sleeve 107 to a position in the clockwise path of release lever 89. When the tapered outer end portion 132 of the clockwise leading edge of release lever 89 engages sleeve 107, because of the taper, sleeve 107 rolls radially outwardly of the lever and around the rounded end 131 of the lever to the same position shown in FIG. 5, and release lever 89 moves onward clockwise to the switch-open position shown in solid lines in FIG. 1, while spring 121 returns latch collar 96, its arm 97 and linkage 99, 103 to the latch position of FIG. 1, and the device is then cocked for another high velocity closure.

We claim:

1. A torque converter for producing a uniform terminal angular velocity comprising an input shaft, an output shaft, a torsion spring connecting said input shaft to said output shaft, said output shaft normally being free to rotate with said input shaft, means for interrupting rotation of said output shaft in one direction at a predetermined location between the ends of the arc of rotation of said shafts, and means responsive to movement of said input shaft in the other direction for unlatching said interrupting means and to movement of said input shaft in said one direction to a predetermined angular position beyond said predetermined location for unlatching said interrupting means whereby torque stored in said spring during the interruption of said output shaft rotates said output shaft throughout the remainder of its arc of operation in said one direction.

2. A torque converter according to claim 1 wherein said output shaft is provided with a radial arm, said interrupting means having a part interposable in the path of said arm.

3. A torque converter for producing a uniform terminal angular velocity comprising an input shaft, an output shaft, a torsion spring connecting said input shaft to said output shaft, means for interrupting rotation of said output shaft intermediate its arc of rotation in one direction, and means responsive to movement of said input shaft in the other direction for latching said interrupting means and to movement of said input shaft to a predetermined angular position in said one direction for unlatching said interrupting means whereby torque stored in said spring rotates said output shaft throughout the remainder of its arc of operation in said one direction, said output shaft being provided with a radial arm, said interrupting means having a part interposable in the path of said arm, fixed structure journaling said shafts wherein said interrupting means comprises a pair of links extending generally radially from said shafts, means connecting a first end of each of said links to each other and forming said interposable part, a second end of one of said links being pivoted to said fixed structure radially outwardly of said arm, and a second end of said other link being pivoted to said latching means whereby on rotation of said input shaft in said other direction, said interposable part is moved into the arcuate path of said arm.

4. A torque converter according to claim 3 wherein said shafts are coaxial and said latching means comprises a second radial arm freely rotatable with respect to said shafts, said one link being pivoted to said arm to cause movement of said interposable part out of the path of said first radial arm when rotated in one direction, there being an arcuate lost-motion connection between said input shaft and said second radial arm whereby to permit initial movement of said input shaft in said one direction to said predetermined angular position without transmitting such movement to said second radial arm and thereafter transmitting movement in said one direction to said second radial arm to cause movement of said links and said interposable part out of the path of said first radial arm.

5. A torque converter according to claim 4 including resilient means biasing said second radial arm in said other direction for moving said interposable part into the path of said first radial arm when said input shaft is rotated in said other direction.

6. A torque converter according to claim 5 wherein the leading edge of said first radial arm with respect to said one direction of movement is radial of said shafts whereby to be positively engaged by said interposable part during movement in said one direction.

7. A torque converter according to claim 6 wherein the trailing edge of said first radial arm with respect to movement in said one direction is tapered outwardly and forwardly whereby to deflect said interposable part radially outwardly of said first radial arm during movement of said shafts in said other direction, said deflection being accommodated by the resilience of said resilient element, said interposable part being returned to its interposed position in the path of said arm in said one direction after its deflection by said arm by the action of said resilient element on said second radial arm.

8. A torque converter according to claim 7 including a third radial arm rigidly mounted on said input shaft and having a portion engageable with said radial leading edge of said first radial arm for positively urging said trailing edge of said first radial arm into deflecting engagement with said interposable part during movement of said shafts in said other direction.

9. A torque converter according to claim 8 wherein said interposable part comprises a pivot element connecting said links and a sleeve rotatably mounted about said pivot element for rolling antifrictional engagement with the leading and trailing edges of said first radial arm during movements of the latter in respectively opposite directions.

10. A torque converter according to claim 9 wherein said other links comprise a pair of elements spaced from each other in a direction parallel to the axis of said shafts in opposite directions from said first radial arm and said pivot element and sleeve are elongated parallel to said shafts.

11. A torque converter according to claim 9 wherein the extremity of said first radial arm is rounded to facilitate rolling therearound of said sleeve during movements of said first radial arm past said interposable part.

12. A torque converter according to claim 1 wherein said input and output shafts are coaxial and said torsion spring comprises a coil spring coaxial with said shafts and anchored at its opposite ends respectively to said input and output shafts.

13. A torque converter device according to claim 12 wherein said shafts are hollow and said coil spring is positioned inwardly of said shafts.

14. A torque converter device according to claim 1 having a housing surrounding said shafts, said shafts protruding from said housing.

15. A torque converter device according to claim 14 wherein said shafts are vertical and said housing is provided with an outwardly extending support bracket radial with respect to said shafts.

16. A torque converter for producing a uniform terminal angular velocity comprising an input shaft, and output shaft, a torsion spring connecting said input to said output shaft, means for interrupting rotation of said output shaft intermediate its arc of rotation in one direction, means responsive to movement of said input shaft in the other direction for latching said interrupting means and to movement of said input shaft to a predetermined angular position in said one direction for unlatching said interrupting means whereby torque stored in said spring rotates said output shaft throughout the remainder of its arc of operation in said one direction, and means for adjusting the direction of operation whereby said one direction may be made clockwise or counterclockwise as desired and said other direction similarly reversed.

17. A torque converter for producing a uniform terminal angular velocity comprising an input shaft, an output shaft, a torsion spring connecting said input shaft to said output shaft, means for interrupting rotation of said output shaft intermediate its arc of rotation in one direction, and means responsive to movement of said input shaft in the other direction for latching said interrupting means and to movement of said input shaft to a predetermined angular position in said one direction for unlatching said interrupting means whereby torque stored in said spring rotates said output shaft throughout the remainder of its arc of operation in said one direction, and means for selectively varying the arc of operation.

18. The combination of an electrical switch blade, a shaft operatively connected to said switch blade for moving said switch blade arcuately between open and closed positions, and means for rotating said shaft in both directions to operate said switch blade, said rotating means comprising a torque converter having an output shaft rigidly connected to said operating shaft, and input shaft, a torsion spring connecting said input shaft to said output shaft, said output shaft normally being free to rotate with said input shaft, means for interrupting rotation of said output shaft in switch-closing direction, at a predetermined location between the ends of the arc of rotation of end shafts and means responsive to movement of said input shaft in switch-opening direction for latching said interrupting means and to movement of said input shaft, in said switch-closing direction, to a predetermined angular position beyond said predetermined location for unlatching said interrupting means whereby torque stored in said spring rotates said output shaft throughout the remainder of its arc of operation in said switch-closing direction.

19. The combination according to claim 18 wherein said output shaft is provided with a radial arm, said interrupting means having a part interposable in the path of said arm.

20. The combination of an electrical switch blade, a shaft operatively connected to said switch blade for moving said switch blade arcuately between open and closed positions, and means for rotating said shaft in both directions to operate said switch blade, said rotating means comprising a torque converter having an output shaft rigidly connected to said operating shaft, an input shaft, a torsion spring connecting said input shaft to said output shaft, means for interrupting rotation of said output shaft intermediate its arc of rotation in switch-closing direction, and means responsive to movement of said input shaft in switch-opening direction for latching said interrupting means and to movement of said input shaft, to a predetermined angular position in said switch-closing direction for unlatching said interrupting means whereby torque stored in said spring rotates said output shaft throughout the remainder of its arc of operation in said switch-closing direction, said output shaft being provided with a radial arm, said interrupting means having a part interposable in the path of said arm, a housing enclosing said input and output shafts wherein said interrupting means comprises a pair of links extending generally radially from said shafts, means connecting a first end of each of said links to each other and forming said interposable part, a second end of one of said links being pivoted to said fixed structure radially outwardly of said arm, and a second end of said other link being pivoted to said latching means whereby on rotation of said input shaft in said switch-opening direction, said interposable part is moved into the arcuate path of said arm.

21. The combination according to claim 20 wherein said input and output shafts are coaxial and said latching means comprises a second radial arm freely rotatable with respect to said shafts, said one link being pivoted to said arm to cause movement of said interposable part out of the path of said first radial arm when rotated in switch-closing direction, there being an arcuate lost-motion connection between said input shaft and said second radial arm whereby to permit initial movement of said input shaft in said switch-closing direction to said predetermined angular position without transmitting such movement to said second radial arm and thereafter transmitting movement in said switch-closing direction to said second radial arm to cause movement of said links and said interposable part out of the path of said first radial arm.

22. The combination according to claim 21 including resilient means biasing said second radial arm in said switch-opening direction for moving said interposable part into the path of said first radial arm when said input shaft is rotated in said switch-opening direction.

23. The combination according to claim 22 wherein the leading edge of said first radial arm with respect to said switch-closing direction of movement is radial of said shafts whereby to be positively engaged by said interposable part during movement in said switch-closing direction.

24. The combination according to claim 23 wherein the trailing edge of said first radial arm with respect to movement in said switch-closing direction is tapered outwardly and forwardly whereby to deflect said interposable part radially outwardly of said first radial arm during movement of said shafts in said switch-opening direction, said deflection being accommodated by the resilience of said resilient element, said interposable part being returned to its interposed position in the path of said arm in said switch-closing direction after its deflection by said arm by the action of said resilient element on said second radial arm.

25. The combination according to claim 24 including a third radial arm rigidly mounted on said input shaft and having a portion engageable with said radial leading edge of said first radial arm for positively urging said trailing edge of said first radial arm into deflecting engagement with said interposable part during movement of said shafts in said switch-opening direction.

26. The combination according to claim 25 wherein said interposable part comprises a pivot element connecting said links and a sleeve rotatably mounted about said pivot element for rolling antifrictional engagement with the leading and trailing edges of said first radial arm during movements of the latter in respectively opposite directions.

27. The combination according to claim 26 wherein said other links comprise a pair of elements spaced from each other in a direction parallel to the axis of said shafts in opposite directions from said first radial arm and said pivot element and sleeve are elongated parallel to said shafts.

28. The combination according to claim 27 wherein the extremity of said first radial arm is rounded to facilitate rolling therearound of said sleeve during movements of said first radial arm past said interposable part.

29. The combination according to claim 28 wherein said input and output shafts are coaxial and said torsion spring comprises a coil spring coaxial with said shafts and anchored at its opposite ends respectively to said input and output shafts.

30. The combination according to claim 29 wherein said shafts are hollow and said coil spring is positioned inwardly of said shafts.